US009817254B2

(12) United States Patent
Iwamoto et al.

(10) Patent No.: US 9,817,254 B2
(45) Date of Patent: Nov. 14, 2017

(54) STABILIZATION GAS ENVIRONMENTS IN A PROTON-EXCHANGED LITHIUM NIOBATE OPTICAL CHIP

(71) Applicant: Honeywell International Inc., Morristown, NJ (US)

(72) Inventors: Nancy E. Iwamoto, Ramona, CA (US); Steven J. Sanders, Scottsdale, AZ (US); Stephen F. Yates, South Barrington, IL (US); Paul S. Fechner, Plymouth, MN (US); Austin Taranta, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 133 days.

(21) Appl. No.: 14/628,933

(22) Filed: Feb. 23, 2015

(65) Prior Publication Data

US 2016/0246079 A1  Aug. 25, 2016

(51) Int. Cl.
*G02F 1/035* (2006.01)
*G02B 6/00* (2006.01)
(Continued)

(52) U.S. Cl.
CPC ............. *G02F 1/035* (2013.01); *G01C 19/72* (2013.01); *G01C 19/722* (2013.01); *G02B 6/102* (2013.01);
(Continued)

(58) Field of Classification Search
CPC .. G02B 6/102; G02B 6/12; G02B 2006/1204; G01C 19/72; G01C 19/722; G01C 19/726; G02F 1/035; G02F 1/095
(Continued)

(56) References Cited

U.S. PATENT DOCUMENTS 5,902,916 A     5/1999  Ruhl et al.
6,071,600 A     6/2000  Rosenmayer
(Continued)

FOREIGN PATENT DOCUMENTS

EP     1600531     11/2005
EP     2082426     12/2012
(Continued)

OTHER PUBLICATIONS

Iwamoto et al., "Exhibit B: Treatment and/or Stabilizing Gases in an Optical Gyro Based on an Inorganic Waveguide", "U.S. Appl. No. 14/243,455, filed Apr. 2, 2014", Apr. 2, 2014, pp. 1-56, Published in: US.

(Continued)

*Primary Examiner* — Akm Ehnayet Ullah
*Assistant Examiner* — Michael Mooney
(74) *Attorney, Agent, or Firm* — Fogg & Powers LLC

(57) ABSTRACT

A stabilized integrated optical circuit is presented. The stabilized integrated optical circuit includes at least one integrated optical chip formed from at least one inorganic material, a stabilizing-polarizable-fill gas, and an enclosure enclosing the at least one integrated optical chip and the stabilizing-polarizable-fill gas. At least one surface of the at least one integrated optical chip is modified by a treatment with at least one treatment gas selected to stabilize defects on the at least one surface. The stabilizing-polarizable-fill gas includes $N_2O$ and at least one polarizable material.

20 Claims, 5 Drawing Sheets

(51) Int. Cl.
*G01C 19/72* (2006.01)
*G02B 6/10* (2006.01)
*G02B 6/12* (2006.01)

(52) U.S. Cl.
CPC ........ *G02B 6/12* (2013.01); *G02B 2006/1204* (2013.01)

(58) Field of Classification Search
USPC .......................... 385/1–10, 32, 14, 141–145; 356/459–466
See application file for complete search history.

(56) References Cited

U.S. PATENT DOCUMENTS

| | | | |
|---|---|---|---|
| 6,218,288 | B1 | 4/2001 | Li et al. |
| 6,451,289 | B2 | 9/2002 | Wherry, III et al. |
| 7,228,046 | B1 | 6/2007 | Hendry et al. |
| 7,323,050 | B2 | 1/2008 | Shiono |
| 7,351,657 | B2 | 4/2008 | Barnes et al. |
| 7,645,633 | B2 | 1/2010 | Barnes et al. |
| 8,070,368 | B1 | 12/2011 | Moody et al. |
| 8,189,981 | B2 | 5/2012 | Muller et al. |
| 8,405,280 | B2 | 3/2013 | Ochi et al. |
| 8,821,649 | B2 | 9/2014 | Kanda et al. |
| 2003/0024475 | A1 | 2/2003 | Anderson |
| 2007/0116421 | A1 | 5/2007 | Hendry et al. |
| 2007/0247782 | A1 | 10/2007 | Nanataki et al. |
| 2009/0191352 | A1 | 7/2009 | DuFaux et al. |
| 2009/0211526 | A1 | 8/2009 | Tanaka et al. |
| 2009/0230817 | A1 | 9/2009 | Kurachi et al. |
| 2010/0066212 | A1 | 3/2010 | Denneler et al. |
| 2010/0135610 | A1 | 6/2010 | Feth |
| 2011/0117202 | A1 | 5/2011 | Bourke, Jr. et al. |
| 2013/0171546 | A1 | 7/2013 | White et al. |
| 2014/0270617 | A1 | 9/2014 | Muller et al. |
| 2015/0110438 | A1* | 4/2015 | Iwamoto ................ G01C 19/64 385/3 |

FOREIGN PATENT DOCUMENTS

| | | |
|---|---|---|
| JP | 60017078 | 1/1985 |
| WO | 2013128355 | 9/2013 |

OTHER PUBLICATIONS

European Patent Office, "Partial EP Search Report from EP Application No. 1418627036 mailed Mar. 19, 2015", "from Foreign Counterpart of U.S. Appl. No. 14/243,455", Mar. 19, 2015, pp. 1-5, Published in: EP.
Iwamoto et al., "Exhibit A: Invention Disclosure—Treatment and/or Stabilizing Gases in an Optical Gyro Based on an Inorganic Waveguide", Jul. 13, 2013, pp. 1-3, Publisher: Honeywell International Inc.
Iwamoto et al., "Exhibit C: Treatment and/or Stabilizing Gases in an Optical Gyro Based on an Inorganic Waveguide", "U.S. Appl. No. 61/894,625, filed Oct. 23, 2013",, pp. 1-53, Published in: US.
Steven J. Sanders, "Declaration of Steven J. Sanders Under 37 CFR 1.132", Mar. 27, 2015, pp. 1-2.
European Patent Office, "Extended European Search Report from EP Application No. 14186270.6 mailed Jul. 10, 2015", "from Foreign Counterpart of U.S. Appl. No. 14/243,455", Jul. 10, 2015, pp. 1-14, Published in: EP.
Zeng et al., "Oxygen Adsorption on Anatase TiO2 (101) and (001) Surfaces From First Principles", "Materials Transactions", Dec. 9, 2009, pp. 171-175, vol. 51, No. 1, Publisher: The Japan Institute of Metals, Published in: JP.
U.S. Patent and Trademark, "Restriction Requirement", Mar. 7, 2016, pp. 1-8.
European Patent Office, "Office Action from EP Application No. 14186270.6 mailed May 3, 2016", "from Foreign Counterpart of U.S. Appl. No. 14/243,455", May 3, 2016, pp. 1-7, Published in: EP.
US Patent and Trademark Office, "Office Action", "U.S. Appl. No. 14/243,455", Sep. 30, 2016, pp. 1-30, Published in: US.
Catella et al, "Effect of Nitrogen on the Linear Oxidation of Niobium", "Jun. 1971", pp. 1006-1009, vol. 118, No. 6, Publisher: J. Electochem. Soc.: Solid State Science.
US Patent and Trademark Office, "Final Office Action", "U.S. Appl. No. 14/243,455", May 8, 2017, pp. 1-15, Published in: US.
Iwamoto et al., "Treatment and/or Stabilizing Gases in an Optical Gyro Based on an Inorganic Waveguide", "U.S. Appl. No. 14/243,455, filed Apr. 2, 2014", Apr. 2, 2014, pp. 1-56, Published in: US.
Asano et al., "Potassium-doped Co3O4 catalyst for direct decomposition of N2O", "Applied Catalysis B: Environmental", Sep. 19, 2007, pp. 242-249, Publisher: Elsevier B.V.
Chaos et al., "Ambient gas effects during the growth of lithium niobate films by pulsed laser deposition", "Applied Surface Science", 2000, pp. 473-477, Publisher: Elsevier Science B.V.
Jorgensen et al., "High Temperature Transport Processes in Lithium Niobate", "J. Phys. Chem. Solids", 1969, pp. 2639-2648, vol. 30, Publisher: Pergamon Press, Published in: GB.
Parmon et al., "Nitrous oxide in oxidation chemistry and catalysis: application and production", "Catalysis Today", 2005, pp. 115-131, Publisher: Elsevier B.V.
Piskorz et al., "Decomposition of N2O over the surface of covaly spinel: A DFT account of reactivity experiments", "Catalysis Today", May 1, 2008, pp. 418-422, Publisher: Elsevier B.V.
Russo et al., "N2O catalytic decomposition over various spinel-type oxides", "Catalysis Today", Sep. 11, 2006, Publisher: Elsevier B.V.
Schroeder et al., "Determination of Oxidizing Ability of Gases and Gas Mixtures", "Flammability and Sensitivity of Materials in Oxygen-Enriched Atmospheres", 2000, pp. 456-468, vol. 9, Publisher: ASTM Int'l.
Stelmachowski et al., "Mg and Al substituted cobalt spinels as catalysts for low temperature deN2O—Evidence for octahedral cobalt active sites", "Applied Catalysis B: Environmental", May 18, 2013, pp. 105-111, Publisher: Elsevier et al.
Stelmachowski et al., "Strong electronic promotion of Co3O4 towards N2O decomposition by surface alkali dopants", "Catalysis Communications", Jan. 8, 2009, pp. 1062-1065, Publisher: Elsevier B.V.
European Patent Office, "Extended European Search Report from EP Application No. 16155375.5 mailed Jul. 22, 2016", "from Foreign Counterpart of U.S. Appl. No. 14/628,933", Jul. 22, 2016, pp. 1-9, Published in: EP.
U.S. Patent and Trademark Office, "Advisory Action", "U.S. Appl. No. 14/243,455", dated Aug. 10, 2017, pp. 1-5, Published in: US.
U.S. Patent and Trademark Office, "Office Action", "U.S. Appl. No. 14/243,455", dated Sep. 8, 2017, pp. 1-19, Published in: US.
European Patent Office, "EPO Comm Re Rule 71(3) for EP Application No. 16155375.5", "Foreign Counterpart to U.S. Appl. No. 14/628,933", Sep. 13, 2017, pp. 1-36, Published in: EP.
European Patent Office, "Result of Consultation for EP Application No. 16155375.5", "Foreign Counterpart to U.S. Appl. No. 14/628,933", Jul. 19, 2017, pp. 1-3, Published in: EP.

* cited by examiner

STABILIZATION GAS ENVIRONMENTS IN A PROTON-EXCHANGED LITHIUM NIOBATE OPTICAL CHIP

BACKGROUND

Currently available high-performance fiber-optic gyros (FOG) typically employ lithium niobate modulators. Lithium niobate (LN) is the material of choice for high-bandwidth modulation of the optical phase waveform to allow closed-loop operation of the gyroscope and to enable scale factor nonlinearity on the order of parts per million (ppm) over wide dynamic ranges. It is known that lithium niobate modulators suffer from crystal defects, which produce sensitivities to environment, especially vacuum or other gas exposures. For this reason, some FOG designs employ a hermetic seal with oxygen-based backfill gases to stabilize LN defects that might otherwise be destabilized by vacuum or other gas exposure.

In a vacuum, the uncoordinated sites in the lithium niobate material are not filled, which causes the band gap to drop to a low level that is below the band gap of lithium niobate material in $O_2$. When a LN phase modulator has a low band gap, the modulator has electrical leakage.

Another problem for currently available lithium niobate phase modulators may occur when other components near the lithium niobate phase modulator outgas. Some outgassed species may degrade the LN band gap even further.

Proton exchanged lithium niobate (HN) optical devices used in optical gyroscopes also suffer from performance degradation when a bias voltage is applied to an HN-based optical device, since the bias voltage creates charge carrier migration.

SUMMARY

The present application relates to a stabilized integrated optical circuit. The stabilized integrated optical circuit includes at least one integrated optical chip formed from at least one inorganic material, a stabilizing-polarizable-fill gas, and an enclosure enclosing the at least one integrated optical chip and the stabilizing-polarizable-fill gas. At least one surface of the at least one integrated optical chip is modified by a treatment with at least one treatment gas selected to stabilize defects on the at least one surface. The stabilizing-polarizable-fill gas includes $N_2O$ and at least one polarizable material.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
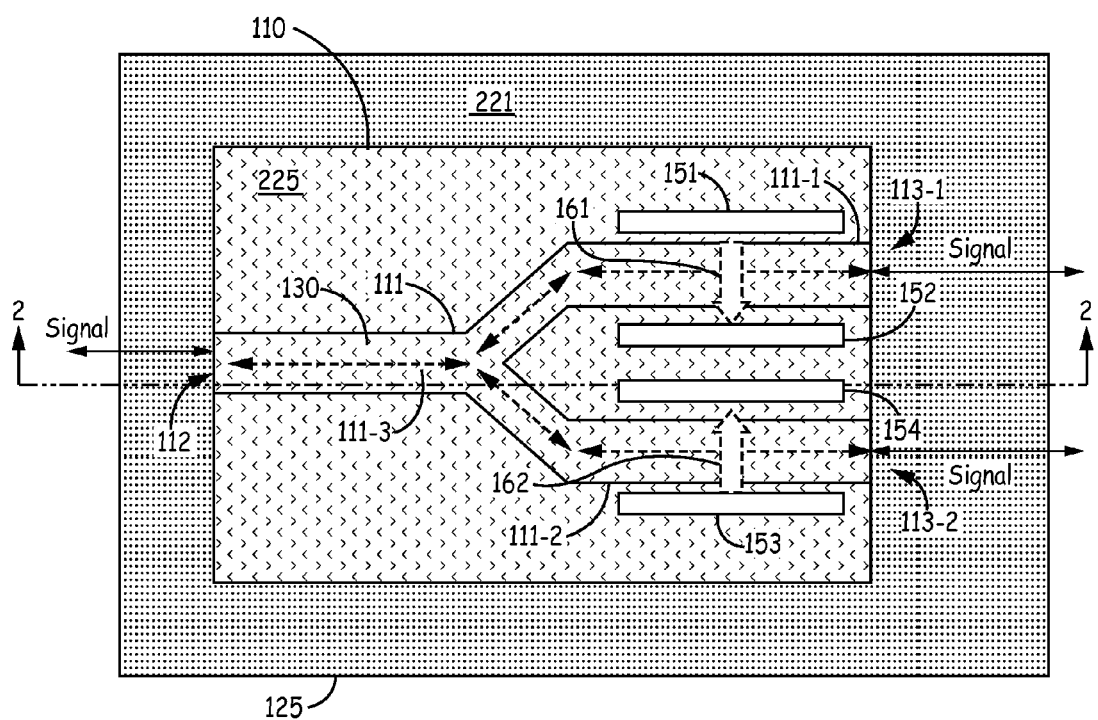
FIG. 1 shows a cross-sectional, top view of an embodiment of a stabilized integrated optical circuit formed from an inorganic material that is treated with a treatment gas and positioned in an enclosure filled with a stabilizing-polarizable-fill gas in accordance with the present application.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

An "inorganic material" includes, but is not limited to, a "niobium oxide-based electro-optic inorganic material" or a "lithium-niobate-based material". The terms "gyroscope" and "gyro" are used interchangeably herein.

High-performance fiber-optic gyroscopes may include modulators formed in a substrate of inorganic material such as lithium-niobate-based material. Lithium niobate (also referred to herein as LN) is a dielectric material that is highly electrically insulating at room temperature. Good gyroscopic performance relies on the stability of the insulating property of the inorganic material over temperature changes and under applied electric fields. Gyro performance is measured by angle noise and scale factor nonlinearity. A high performance gyro has an angle noise of less than 10 arcsec over some bandwidth of interest and a scale factor nonlinearity of less than 100 ppm over some rotation dynamic range.

As is known to one skilled in the art, electrical leakage in crystalline inorganic materials (e.g., LN or HN) is related to the width of the electronic band gap for any surface defect states. The conductivity of a solid is low when the energy gap between the valence band and the conduction band of the material is large compared to thermal energy at the temperatures of operation. A large energy gap (band gap) ensures lower conductivity, while electrical leakage increases as the width of the electronic band gap decreases. Electrical leakage in a phase modulator in a gyroscope increases the angle noise and the scale factor nonlinearity of the gyroscope. When exposed to temperature changes and biasing changes, a lithium-niobate-based waveguide in a prior art integrated optical circuit becomes more conductive, allowing electrical leakage. Specifically, when a prior art integrated optical circuit in a gyroscope is biased, the surface of the chip may become negatively charged, and conduction (or even charge injection) may occur. In this case, the band gap of the prior art integrated optical circuit is degraded and the gyroscope performance is likewise degraded.

When an electrode is used to inject charges into a prior art integrated optical circuit (IOC), there may be a charge build up near an electrode and that area becomes more negative while the area furthest from the charge build up is more positive. The effects of uneven charge distribution on the untreated surface of a prior art IOC take time to offset. When a charge distribution across the untreated surface of the IOC material is caused by an electric field, redistribution of electrons is dependent upon the chip conductivity, which changes as the charges migrate. Slower charge redistribution from proton migration also affects the IOC. The extent of loss of insulator properties of the IOC depends upon how much of the untreated surface of the chip becomes charged. The recovery depends upon how far the protons can migrate back to the original state. If there is remnant charge polarization across the layer due to charges not returning to original positions, the insulating property of the lithium-niobate-based material in the prior art IOC is permanently degraded (i.e., is permanently decreased).

The stabilized integrated optical circuits described herein includes an integrated optical chip, which is formed in an inorganic material with at least one surface modified by a treatment (e.g., by a treatment gas) to stabilize defects, and which is enclosed with a stabilizing-polarizable-fill gas including $N_2O$ and at least one polarizable material (polarizable gas). The stabilizing-polarizable-fill gas is optimally suited to remove, prevent, or minimize surface defect states of the modified surface, even when the circuit is biased by an electric field and/or is subjected to extreme temperature changes. The embodiments of the stabilized integrated optical circuit described herein overcome the disadvantages of the currently available IOCs formed in inorganic materials (e.g., LN-based phase modulators) that are biased by an electric field and/or are subjected to extreme temperature changes.

Figure 2:
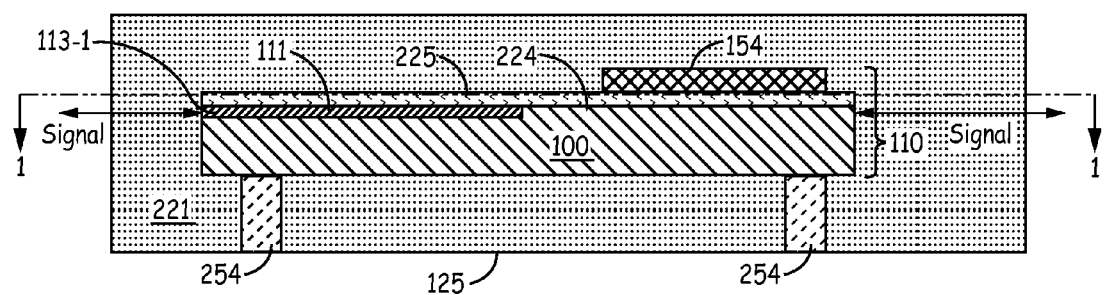
FIG. 2 shows a cross-sectional, side view of the embodiment of the stabilized integrated optical circuit of FIG. 1.

FIG. 1 shows a cross-sectional, top view of an embodiment of a stabilized integrated optical circuit (IOC) 110. The stabilized IOC 110 includes at least one integrated optical chip 100 formed from an inorganic material that is treated with a treatment gas and positioned in an enclosure 125 filled with a stabilizing-polarizable-fill gas 221 in accordance with the present application. FIG. 2 shows a cross-sectional, side view of the embodiment of the stabilized integrated optical circuit 110 of FIG. 1. The plane upon which the cross-section view of FIG. 1 is taken is indicated by section line 1-1 in FIG. 2. The plane upon which the cross-section view of FIG. 2 is taken is indicated by section line 2-2 in FIG. 1. The electronic band gap in a stabilized IOC 110 does not decrease over time as much as the prior art IOC, even when biased by an electric field and/or when subjected to extreme temperature changes. Thus, the performance of an optical system that implements a stabilized integrated optical circuit 110 does not significantly degrade over time since the electrical leakage of the IOC 110 does not increase over time as much as the prior art IOC.

The IOC 110 includes the exemplary integrated optical chip 100 (also referred to herein as "chip 100"), anodes 151 and 153, and cathodes 152 and 154. The chip 100, in which at least one waveguide 111 is formed, includes at least one inorganic material, such as "niobium oxide-based electro-optic inorganic material" or "lithium-niobate-based material".

At least one surface 224 of the chip 100 is treated with at least one treatment gas that modifies the surface 224 prior to use of the fill gas 221 with the chip 100. The "at least one treatment gas" is also referred to herein as "treatment gas". The treatment gas is selected to stabilize defects on the surface 224. The surface 224 that is modified by the treatment gas is represented generally at 225 and is also referred to herein as "modified surface 225". The term "the treatment gas" is also referred to herein as "treating gas". Since the surface 224 of the waveguide 111 is modified by the treatment gas, the modified surface 225 overlays the waveguide 111. The treatment gas is applied to the IOC 110 prior to sealing the IOC 110 in the enclosure 125 and is therefore not visible in FIGS. 1 and 2.

For the IOC 110 to operate reliably and effectively, the modified surface 225 must remain stable over time, temperature changes, and for a variety of charge states. External electric fields, ionizing radiation, the piezo-electric and/or pyro-electric effects can induce a range of charge states on the modified surface 225. A charge state on the modified surface 225 can change (e.g., deform) the bonding of the treatment gas on the modified surface 225. Bond deformations shift the density of states (especially those near the top of the valence bands or in defect states above the valence band) with a resultant reduction in the bandgap.

The embodiments of stabilizing-polarizable-fill gas 221 described in this document provide an inert environment for the treated surface 225 in which the effect of the treatment gas on treated surface 225 is stably maintained over time, temperature changes, and charge states. To ensure action of the treating gas is not counter-acted over time, temperature changes, and/or when subjected to various charge states, the stabilizing-polarizable-fill gas 221 is: large in molecular volume; large in molecular weight; has low dipole moment; has low diffusivity; and is polarizable.

The fill gas properties of large molecular volume, large molecular weight, and low dipole moment ensure the stabilizing-polarizable-fill gas 221 is non-reactive and is non-chelating with the treatment gas (or gases) bonded on the modified surface 225 under a static uncharged state. Low diffusivity is desirable since it tends to prevent the stabilizing-polarizable-fill gas 221 from permeating into other components in the gyro, or from leaking out of the enclosure 125.

The fill gas property of polarizabilty ensures the stabilizing-polarizable-fill gas 221 minimizes or prevents deformations induced by charge states on the modified surface 225. The polarizability of a gas is the degree to which a molecule's electron cloud deforms in response to an external charge. The electron cloud deformation represents an induced dipole, which effectively compensates the induced charge on the modified surface 225 that is exposed to external electric fields, ionizing radiation, the piezo-electric effects, and/or pyro-electric effects. The stabilizing-polarizable-fill gas 221 prevents or minimizes the bandgap reduction of the chip 100 by spreading (i.e., changing, offsetting) the charged state from the modified-surface-bond sites to non-bonding interactions with the stabilizing-polarizable-fill gas 221. In this manner, the stabilizing-polarizable-fill gas 221 compensates for at least some of the charge at the modified surface 225 and reduces the effect of charge diffusion on the modified surface 225 of the IOC 110 when an electric field is applied to the IOC 110. The stabilizing-polarizable-fill gas 221 that is inert yet polarizable is the optimal fill gas with the modified surface 225; it does not impede the action of the treatment gas under uncharged conditions and it tends to ameliorate the condition of the modified surface under charged conditions.

Some exemplary gases that are polarizable include: a perfluorinated hydrocarbon; a chlorfluorocarbon; a hydrofluorocarbon; a hydrochlorofluorocarbon; a perfluorocarbon; chloromethane; and dichloromethane.

Table 1 shows three polarizable gases with the respective calculated dipole moment (Debye), polarizability, and the calculated bandgap (BG) for the treated surface under negative charge in a stabilizing-polarizable-fill gas of $N_2O$ and the respective polarizable gas. In all cases, the bandgap is higher than without the polarizable gas. The same surface under a negative charge in a fill gas of $N_2O$ without a polarizable gas has a band bap of 0.36 eV. The same surface under a negative charge in a fill gas of $O_2$ without a polarizable gas has a bandgap of 1.54 eV. While $O_2$ produces a preferred bandgap as a fill gas, it is often undesirable in an enclosure as it is a strong oxidizer.

TABLE 1

| Polarizable Gas | Calculated Dipole moment (Debye) | Polarizability (CRC $84^{th}$ Ed) | Calculated BG under negative charge with $N_2O$ + gas (eV) |
| --- | --- | --- | --- |
| CF4 | 0.0005 | 3.83 | 0.71 |
| C2F6 | 0.0027 | 6.28 | 0.94 |
| C3F8 | 0.1380 | unavailable | 0.96 |

The waveguide 111 is designed and fabricated to support propagation of optical signals as is known in the art. In the exemplary integrated optical chip 100 shown in FIG. 1, the waveguide 111 has the shape of a y-branch and includes waveguide input/output faces 112, 113-1 and 113-2. Thus, the waveguide 111 functions as a y-branch beam-splitter 130 with a first-waveguide arm 111-1 and a second-waveguide arm 111-2 that branch from a main waveguide 111-3.

The y-branch beam-splitter 130 splits an optical signal input at first input face 112 into two optical signals, which are output from the input/output face 113-1 of the first-waveguide arm 111-1 and from the input/output face 113-2 of the second-waveguide arm 111-2. Since the y-branch beam-splitter 130 is bidirectional, a first optical signal that is input at the input face 113-1 and propagates in the first-waveguide arm 111-1 is combined with a second optical signal that input at the input face 113-2 and propagates in the second-waveguide arm 111-2.

A first anode 151 and a first cathode 152 are adjacent to the waveguide arm 111-1. A second anode 153 and a second cathode 152 are adjacent to the second waveguide arm 111-2. In the embodiment of IOC 110 shown in FIGS. 1 and 2, the first anode 151 and the first cathode 152 control a phase of the first optical signal propagating in the first-waveguide arm 111-1 while the second anode 153 and the second cathode 154 control a phase of the second optical signal propagating in the second-waveguide arm 111-2. The one or more electrodes (e.g., anodes 151 and/or 153) used to inject charges into the IOC 110 cause a charge state in the lithium-niobate-based material of the chip 100 during voltage bias application. However, the problems with charge build up near an electrode described above with reference to the prior art IOC are mitigated by combination of: 1) the treatment that produces the modified surface 225; and 2) the stabilizing-polarizable-fill gas 221. The $N_2O$ in the stabilizing-polarizable-fill gas 221 stabilizes the effect of the treatment gas on the modified surface 225 and the polarizable material of the stabilizing-polarizable-fill gas 221 lowers the diffusion rate of $N_2O$ on the modified surface 225. In this manner, the stabilizing-polarizable-fill gas 221 reduces the effect of charge diffusion on the modified surface 225 of the IOC 110 when an electric field is applied to the IOC 110.

It is to be understood that waveguides having other shapes and/or other optical functions can be formed on the integrated optical chip 100 along with the required electrodes to provide other optical functions on the IOC 110.

In one implementation of this embodiment, the IOC 110 is a phase modulator formed in a proton exchanged lithium niobate material. As defined herein, a proton exchanged lithium niobate material is a lithium-niobate-based material (LN-based material). In another implementation of this embodiment, the lithium in the LN of the IOC 110 is partially exchanged for hydrogen. This produces a mixture of hydrogen niobate within the lithium niobate. In yet another implementation of this embodiment, the partially-proton-exchanged lithium niobate is the material in which the waveguide 111 is formed in the integrated optical chip 100. The partially-proton-exchanged lithium niobate is commonly referred to as annealed-proton-exchanged lithium niobate (or APE lithium niobate). In yet another implementation of this embodiment, fully-hydrogen-exchanged lithium niobate is the base inorganic material used in the IOC 110. The fully-hydrogen-exchanged lithium niobate is referred to herein as hydrogen niobate (or FIN).

In the embodiment shown in FIG. 2, the treatment gas is applied to the chip 100 prior forming the anodes 151 and 153, and cathodes 152 and 154 on the chip 100. In one implementation of this embodiment, the treatment gas is applied to the chip 100 after forming the anodes 151 and 153, and cathodes 152 and 154 on the chip 100.

As shown in FIGS. 1 and 2, the IOC 110 is enclosed in an enclosure 125 with stabilizing-polarizable-fill gas 221, which includes a treatment gas such as $N_2O$ and at least one polarizable material (polarizable gas). The stabilizing-polarizable-fill gas 221 fills the enclosure 125 and is in contact with the modified surface 225. The enclosure is sealed using various techniques known to one skilled in the art. The stabilizing-polarizable-fill gas 221 stabilizes the modified surface 225 treated by the at least one treatment gas as described below.

The IOC 110 is supported on a structure 254 in the enclosure 125. The structure 254 can be any type of support structure to stably hold the IOC 110 in the enclosure 125. In one implementation of this embodiment, the chip 100 is attached to the structure 254 with an adhesive material designed for limited outgassing. In another implementation of this embodiment, the chip 100 is attached to the structure 254 with solder. In yet another implementation of this embodiment, the enclosure 125 supports the IOC 110.

In one implementation of this embodiment, the sealed enclosure 125 is arranged to permit optical fibers to protrude through one or more walls of the enclosure 125 without degrading the effectiveness of the seal of the enclosure 125. In this case, the optical fibers are arranged to couple the optical signals into and out of the waveguide input/output faces 112, 113-1 and 113-2 of the waveguide 111 in the IOC 110.

In another implementation of this embodiment, windows are incorporated in the enclosure 125 so that optical beams can be input and output from the enclosure 125 via the windows. In this case the IOC 110 is arranged to prevent any undesired optical interference between the windows and the waveguide input/output faces 112, 113-1 and 113-2 of the waveguide 111 in the IOC 110.

In yet another implementation of this embodiment, the sealed enclosure 125 is arranged to permit wires or lead lines to bias the anodes 151 and 153 and the cathodes 153 and 154 are to protrude from the enclosure 125 without degrading the effectiveness of the seal of the enclosure 125.

In yet another implementation of this embodiment, the treatment gas is applied to the surface 224 after positioning the IOC 110 in the enclosure 125 to form the modified surface 225 on the IOC 110. In this case, the treatment gas is excavated from the enclosure when the treatment is completed, the stabilizing-polarizable-fill gas 221 is injected into the enclosure 125, and the enclosure is sealed with the stabilizing-polarizable-fill gas 221 in contact with the IOC 110.

In one implementation of this embodiment, the polarizable material in the stabilizing-polarizable-fill gas 221 is a refrigerant. Refrigerants typically contain large electron-dense centers and so have low diffusivity into solid materials, and are non-reactive, non-chelating gases. Advantageously, the large molecular structure of refrigerants helps prevent leakage of the stabilizing-polarizable-fill gas 221 from the sealed enclosure 125.

In F-based refrigerants, the fluorocarbon is unreactive and stable. Fluorine is highly electronegative so the F lone pairs on the CFx group are not liable to donate electrons for coordination. A lone pair is an unreacted electron pair on an atom center. Although non-reactive, refrigerant molecules with their lone pair electrons have high enough polarizability to stabilize the surface, in the presence of an electric field, by polarizing and forming an even more dense non-reactive cover layer over the IOC modified surface 225.

In one implementation of this embodiment, the IOC 110 is enclosed in an enclosure 125 with $N_2O$ and at least one of: a perfluorinated hydrocarbon; a chlorfluorocarbon; a hydrofluorocarbon; a hydrochlorofluorocarbon; a perfluorocarbon; chloromethane; and dichloromethane. In another implementation of this embodiment, the IOC 110 is enclosed in the enclosure 125 with the $N_2O$, $N_2$, and a refrigerant.

In one implementation of this embodiment, the at least one treatment gas used to pretreat the chip 100 includes $N_2O$. In another implementation of this embodiment, the at least one treatment gas includes at least a first treatment gas and a second treatment gas, which are both used to treat the surface 224 prior to exposure of the chip 100 to a stabilizing-polarizable-fill gas 221. In yet another implementation of this embodiment, the surface 224 of the chip 100 is exposed to the first treatment gas and the second treatment gas as a combined mixture. In yet another implementation of this embodiment, the surface 224 of the chip 100 is first exposed to a first treatment gas (for example, $N_2O$) and then the surface 224 of the chip 100 is next exposed to a second treatment gas (for example, an inert gas).

In yet another implementation of this embodiment, the first treatment gas includes a reactive oxidizing gas and the second treatment gas includes $N_2O$. In yet another implementation of this embodiment, the first treatment gas is $N_2O$ and the second treatment gas is $N_2$. In yet another implementation of this embodiment, the first treatment gas includes a reactive oxidizing gas and the second treatment gas includes a nonreactive gas. For example, the first treatment gas used to pretreat the lithium-niobate-based material can be selected from the following listing of reactive gases: $O_3$, O, NO, $NO_2$, $N_2O$, $SO_2$, SO, $SF_6$, and $NF_3$ and second treatment gas to which the lithium-niobate-based material is exposed is a mixture of $N_2O$ and a noble or non-reactive gas.

Examples of other nonreactive gases suitable for use as the second treatment gas are $N_2$, $CO_2$, a noble gas, CO, $O_2$ and saturated hydrocarbons. The gases that are truly non-reactive gases are the noble gases and saturated hydrocarbons. The coordinating gases that coordinate on Nb but do not break bonds are $N_2$, $CO_2$, CO, and $O_2$. The gas $N_2O$ is either a reactive or a coordinating gas, depending upon the conditions.

The process of obtaining the highest coordination saturation may be achieved by alternate gases or treatments. For instance $N_2O$ may be used to either oxidize the surface or coordinate a neutral ($N_2O$) ligand to fulfill niobium coordination saturation.

$N_2O$ is known to form a reactive oxidant O species at elevated temperatures, so increasing the reactivity of $N_2O$ may be accomplished by various methods such as an increase in temperature. Temperatures in the 200-300° C. range may be needed without other activation methods. However other activation methods can be used to reduce the oxidation temperatures to as low as 100-200° C., by adding $O_2$ or air into the gas mixture and/or using an alkali activator impregnated at the surface which may be applied by a solution coat, dip or wash procedure of an alkali metal salt. Alkali activators also help to maintain reactivity of the surface toward $N_2O$ in the presence of water. In this context, alternate processes use a combination of moisture-free IOC surface, and/or a pretreatment with an alkali metal salt, and the $N_2O$ used in an $O_2$ or an $O_2$ mixture (air, $N_2$ or $CO_2$ as examples of other gases in the mixture) at elevated temperatures at 100° C. or above.

The selected treatment for the IOC 110 should be made in consideration of the fabrication processes used to form the IOC 110, since any wet or dry etching processes potentially provide a pretreatment to the IOC 110.

The phases of the optical signals propagating in the first-waveguide arm 111-1 and the second-waveguide arm 111-2 are controlled by the electrodes 151-154. The first electric field 161 is directed from the first anode 151 to the first cathode 152. The second electric field 162 is directed from the second anode 153 to the second cathode 154. The charge buildup near any one of the electrodes on prior art IOCs has the potential to degrade the performance of a prior art IOC by changing the conductivity state of the lithium-niobate-based material during long-term (i.e., minutes or longer) voltage bias application.

The embodiments of the IOC 110 described in the present application minimize any change in conductivity state during long-term (i.e., minutes or longer) voltage biasing since the stabilizing-polarizable-fill gas 221 with large inert, non-interacting gases stabilizes the effects on the LN or FIN band gap over a range of charge states, and stabilizes the band gap of the LN or FIN material. When an electric field is applied to the IOC 110, the diffusion rate for $N_2O$ in the modified surface 225 is relatively stable (with respect to the surface of a prior art IOC) because of the interactions with the $N_2O$ and the large inert, non-interacting polarizable material of the stabilizing-polarizable-fill gas 221.

Figure 3:
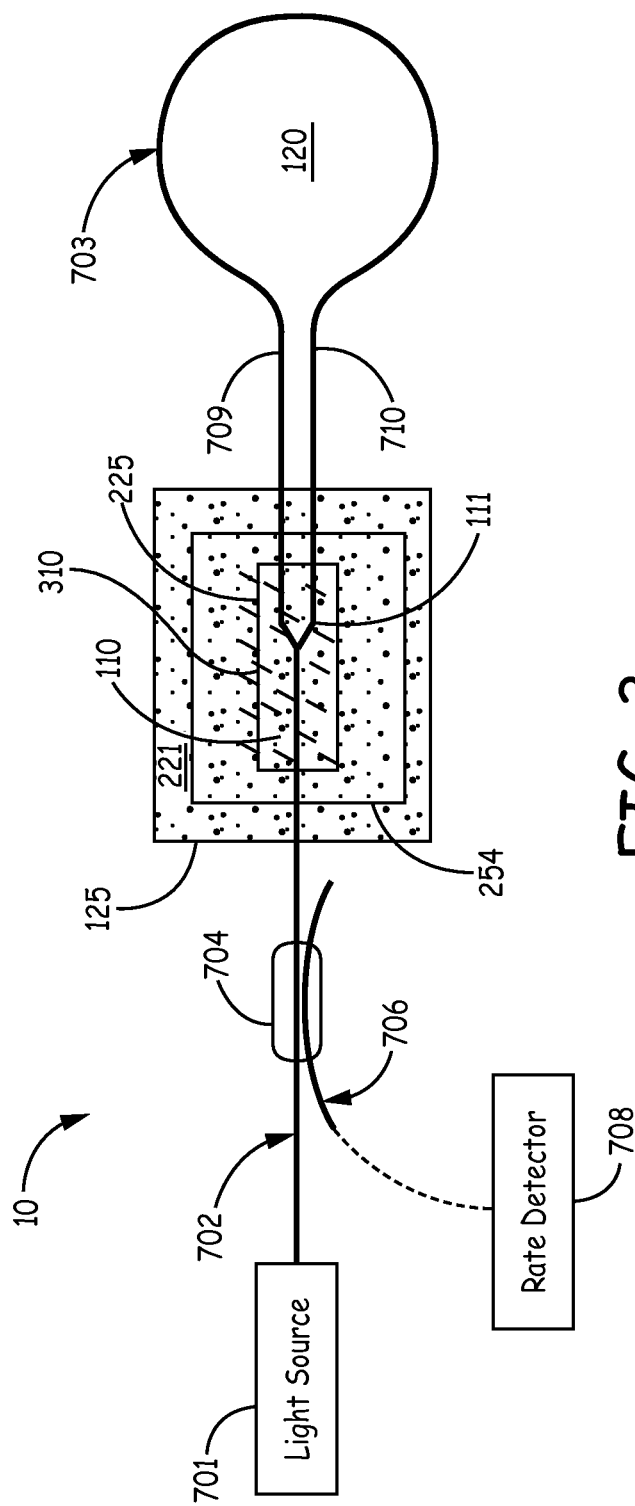
FIG. 3 shows an embodiment of a gyroscope system including an integrated optical circuit formed from an inorganic material that is treated with a treatment gas and positioned in an enclosure filled with a stabilizing-polarizable-fill gas in accordance with the present application.

FIG. 3 shows an embodiment of a gyroscope system 10 including an integrated optical circuit 110 formed from an inorganic material that is treated with a treatment gas and positioned in an enclosure 125 filled with a stabilizing-polarizable-fill gas 221 in accordance with the present application. The gyroscope system 10 shown in FIG. 3 is a high performance interference fiber optic gyroscope (IFOG) system 10 and the IOC 110 includes a phase modulator 310. The phase modulator 310 in the IFOG system 10 is similar in structure and function to the IOC 110 described above with reference to FIGS. 1 and 2. The phase modulator 310 can be formed as any one of the embodiments of IOC 110 described above with reference to FIGS. 1 and 2. Both LN and HN have the same performance concerns when used to form a phase modulator 310 in a gyroscope. The phase modulator 310 overcomes the problems of currently available phase modulators as described above.

IFOG system 10 includes broadband light source 701. Broadband light source 701 generates a light signal that is comprised of many waves with different wavelengths and polarization states. Input fiber 702 couples broadband light source 701 to coupler 704 and the same fiber 702 couples light from coupler 704 to the waveguide of the phase modulator 310. Coupler 704 includes both input fiber 702 and output fiber 706. Output fiber 706 carries a returned signal from the phase modulator 310 to a rate detector 708, which reads the signal returning from the sensing fiber 703. The phase modulator 310 includes a beam-splitting/combining element 111, a polarizing element, and two or more electrodes (151-154) used for phase-modulation of the light beams propagating through the phase modulator 310. In one embodiment, the beam-splitter is the y-branch beam-splitter 130, described above with reference to FIGS. 1 and 2, that is used to split the optical signal into two optical signals. In some embodiments, the polarizing element is integral to the waveguide of the phase modulator 310, while in other embodiments the polarizing element is a separate element along the optical path. The signal from the broadband light source 701 is linearly polarized by passing through the phase modulator 310. Pigtail fibers 709 and 710 couple the phase modulator 310 to sensing coil 120. In one embodiment, the signal is depolarized with a depolarizer placed between the sensing coil 120 and the phase modulator 310. The depolarizer can be placed on either pigtail fiber 709 and/or 710. Sensing coil 120 comprises the sensing fiber 703 wound in a coil shape.

The phase modulator 310 is enclosed in a gas-filled enclosure 125. The enclosure 125 is filled with the stabilizing-polarizable-fill gas 221 and sealed to keep the stabilizing-polarizable-fill gas 211 in the enclosure 125. The phase modulator 310 is supported on the structure 254 and aligned to input the optical beam from the light source 701 via the optical fiber 702 to output light to the sensing fiber 703.

The phase modulator 310 is functional in IFOG system 10 which is operational to measure a rotation of a vehicle in which the IFOG system 10 is housed. Other types of gyroscope systems can be made with the IOC 110 described herein as is understandable to one skilled in the art. For example, if the optical system is a resonant fiber optic gyroscope, the phase modulator 310 can be replaced with a CCW modulator and a CW modulator as is understandable to one skilled in the art.

In one implementation of this embodiment, the IFOG system 10 encases the stabilizing-polarizable-fill gas 221 in contact with the light source 701, the input fiber 702, the output fiber 706, the coupler 704, and the rate detector 708. In this embodiment, the IFOG system 10 is designed with appropriate stabilizing-polarizable-fill gas 221) and/or treatment gases to stabilize the performance of the inorganic material of the chip 100 (FIG. 2) and to minimize reaction with the other components/materials in the IFOG system 10 (e.g., the light source 701, the input fiber 702, the output fiber 706, the coupler 704, and the rate detector 708) that are encased in the enclosure 125 with the stabilizing-polarizable-fill gas 221.

Figure 4:
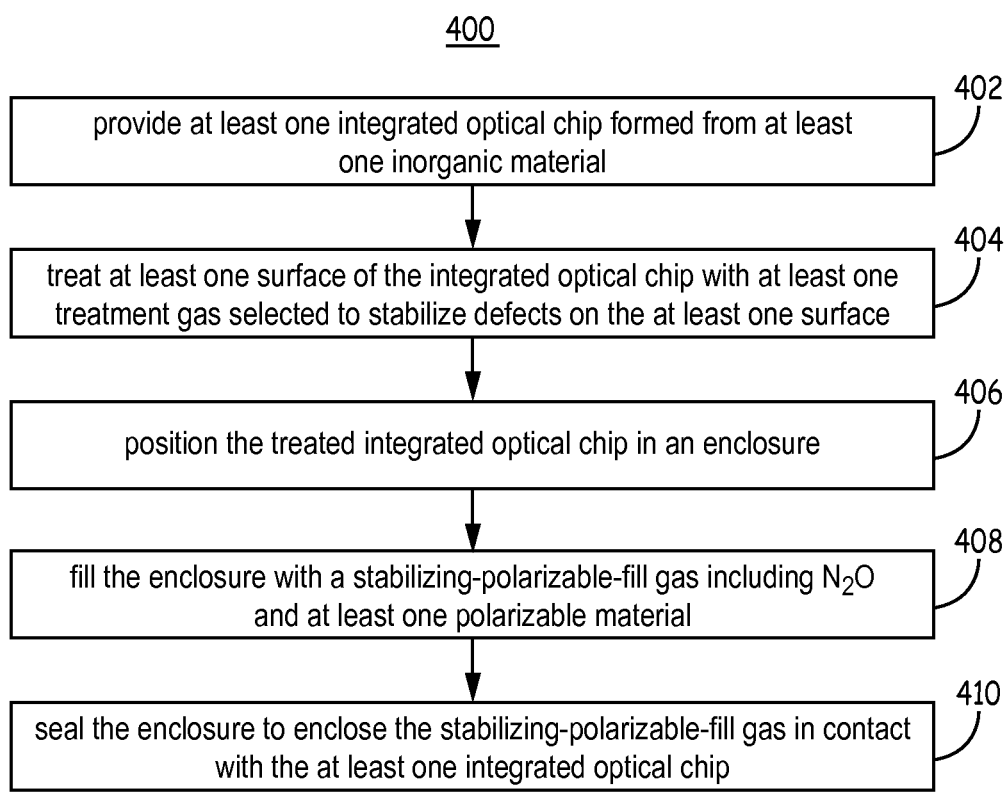
FIG. 4 is a flow diagram of an embodiment of a method to stabilize an integrated optical circuit in accordance with the present application.

FIG. 4 is a flow diagram of an embodiment of a method 400 to stabilize an integrated optical circuit in accordance with the present application. The method is described with reference to FIGS. 1 and 2.

At block 402, at least one integrated optical chip 100 formed from at least one inorganic material is provided. In embodiments, the inorganic material is LN or FIN as described above with reference to FIGS. 1 and 2. At block 404, at least one surface 224 of the integrated optical chip 100 is treated by a treatment with at least one treatment gas selected to stabilize defects on the at least one surface 224. The treatment gas modifies the surface 224 to form modified surface 225. The treatment gas is any of the embodiments of treatment gases described above with reference to FIGS. 1 and 2. In one implementation of this embodiment, treating the at least one surface 224 of the integrated optical chip 100 with the at least one treatment gas includes treating the at least one surface of the integrated optical chip 100 with a reactive oxidizing gas.

At block 406, the treated integrated optical chip 100 is positioned in an enclosure 125. In one implementation of this embodiment, the process of block 406 occurs before the process of block 404. In this case, the untreated (or partially treated) integrated optical chip 100 is positioned in an enclosure 125 and the treatment gas is injected into the enclosure 125 with the chip 100 so that the at least one surface 224 of the chip 100 is treated while in the enclosure 125. Then the treatment gas is removed from the enclosure 125.

At block 408, the enclosure 125 is filled with a stabilizing-polarizable-fill gas 221. The stabilizing-polarizable-fill gas 221 includes $N_2O$ and at least one polarizable material (e.g., at least one polarizable gas). The stabilizing-polarizable-fill gas 221 stabilizes the at least one modified surface 225 of the integrated optical chip 100. The presence of the at least one polarizable material in the stabilizing-polarizable-fill gas 221 reduces an effect of a charge diffusion on the at least one modified surface 225 of the integrated optical chip 100 when an electric field 161 or 162 is applied to the at least one lithium-niobate-based integrated optical chip 100 (e.g., at least one phase modulator 310). The stabilizing-polarizable-fill gas 221 is any of the embodiments of fill gases 221 described above with reference to FIGS. 1 and 2.

At block 410, the enclosure 125 is sealed to enclose the at least one integrated optical chip 110 and the stabilizing-polarizable-fill gas 221. The stabilizing-polarizable-fill gas 221 in contact with the treated surface 225 ensures the treated surface 225 is stabilized over time and in the presence of electric charges. In this manner, the IOC 110 is stabilized for long-term use in an optical system, such as a gyroscope system 10 (FIG. 4). The stabilized IOC 110 is any optical component formed from an inorganic material for use in any type of optical system that requires optical components that do not degrade over time due to crystal defects and/or surface defects in the organic material used to form the optical component.

Figure 5:
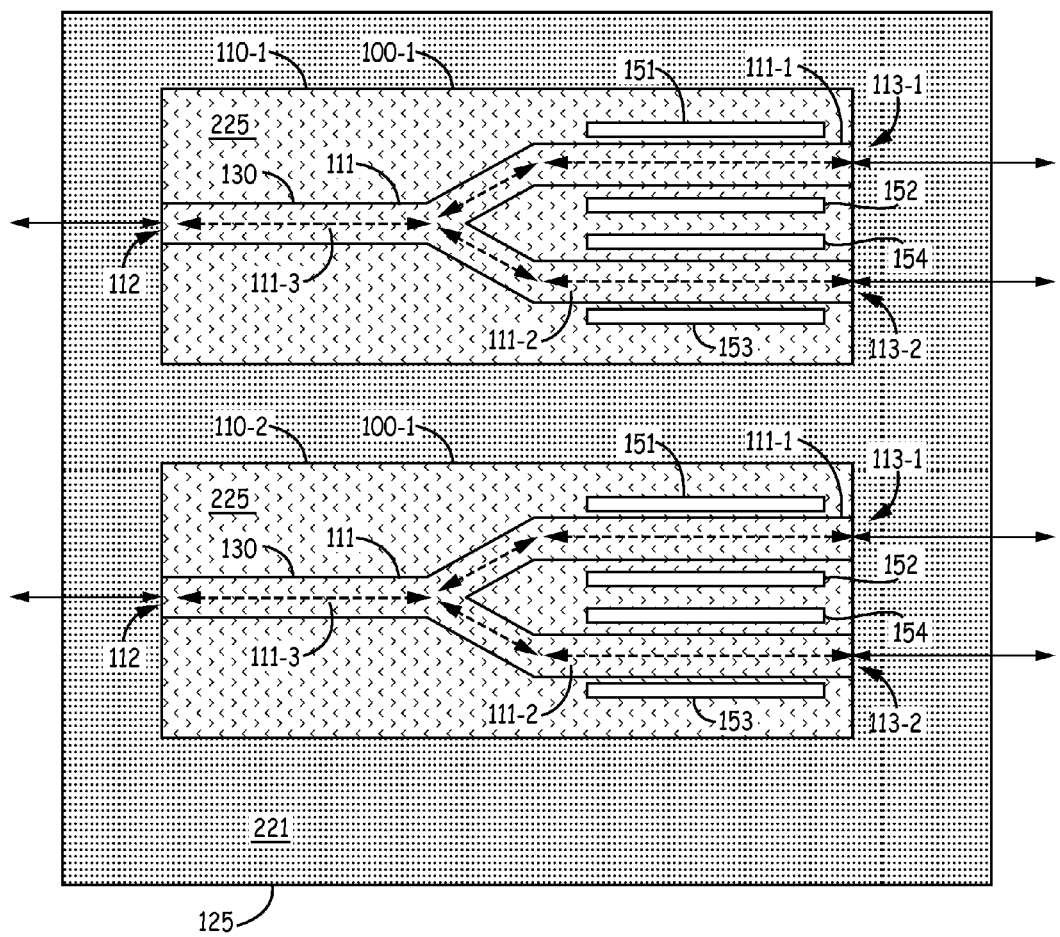
FIG. 5 shows a cross-sectional top view of an embodiment of two stabilized integrated optical circuits positioned in an enclosure filled with a stabilizing-polarizable-fill gas in accordance with the present application.

FIG. 5 shows a cross-sectional, top view of an embodiment of two stabilized integrated optical circuits 110-1 and 110-2 positioned in an enclosure 125 filled with stabilizing-polarizable-fill gas 221 in accordance with the present application. The two stabilized integrated optical circuits 110-1 and 110-2 include two respective integrated optical chips 100-1 and 100-2. The integrated optical chips 100-1 and 100-2 and integrated optical circuit 110-1 and 110-2 have the same structure and function as the embodiment of the integrated optical chip 100 and integrated optical circuit 110 described above with reference to FIGS. 1, 2, and 3. Both of the integrated optical circuit 110-1 and 110-2 can be enclosed in an enclosure 125 and sealed with a fill gas 221 as described above with reference to method 400 described above with reference to FIG. 4.

The stabilized IOCs 110-1 and 110-2 are any optical components formed from an inorganic material for use in any type of optical system that requires at least two stabilized optical components.

The optical components (e.g., phase modulators) described herein have a high band gap with little or no electrical leakage. These optical components can be used in systems without degradation for an extended time even when a bias voltage is applied to optical component, since the stabilizing-polarizable-fill gas maintains the stability of the treatment applied to the integrated optical chips and reduces charge carrier migration on the integrated optical chips. For example, phase modulators described herein can be used in gyroscope systems with scale factor nonlinearity on the order of parts per million (ppm) over wide dynamic ranges.

EXAMPLE EMBODIMENTS

Example 1 includes a stabilized integrated optical circuit comprising: at least one integrated optical chip formed from at least one inorganic material, wherein at least one surface of the at least one integrated optical chip is modified by a treatment with at least one treatment gas selected to stabilize defects on the at least one surface; a stabilizing-polarizable-fill gas including N2O and at least one polarizable material; and an enclosure enclosing the at least one integrated optical chip and the stabilizing-polarizable-fill gas.

Example 2 includes the stabilized integrated optical circuit of Example 1, wherein the at least one integrated optical chip formed from at least one inorganic material is at least one phase modulator formed from a lithium-niobate-based material.

Example 3 includes the stabilized integrated optical circuit of Example 2, wherein the at least one treatment gas includes a reactive oxidizing gas.

Example 4 includes the stabilized integrated optical circuit of Example 3, wherein the at least one polarizable material includes a refrigerant.

Example 5 includes the stabilized integrated optical circuit of any of Examples 2-4, wherein the at least one treatment gas includes at least a first treatment gas and a second treatment gas, wherein the first treatment gas includes a reactive oxidizing gas and the second treatment gas includes N2O, and wherein the at least one polarizable material is a refrigerant.

Example 6 includes the stabilized integrated optical circuit of any of Examples 2-5, wherein the at least one treatment gas includes at least a first treatment gas and a second treatment gas, wherein the first treatment gas is $N_2O$ and the second treatment gas is N2, and wherein the at least one polarizable material is a refrigerant.

Example 7 includes the stabilized integrated optical circuit of any of Examples 1-6, wherein the at least one polarizable material is at least one of: a perfluorinated hydrocarbon; a chlorfluorocarbon; a hydrofluorocarbon; a hydrochlorofluorocarbon; a perfluorocarbon; chloromethane; and dichloromethane.

Example 8 includes the stabilized integrated optical circuit of any of Examples 1-7, wherein the at least one integrated optical chip formed from at least one material is formed from a lithium-niobate-based material, wherein the at least one treatment gas includes a reactive oxidizing gas, and wherein the at least one polarizable material is a refrigerant.

Example 9 includes the stabilized integrated optical circuit of any of Examples 1-8, wherein the at least one treatment gas includes at least a first treatment gas and a second treatment gas wherein the first treatment gas includes a reactive oxidizing gas and the second treatment gas includes a nonreactive gas, and wherein the at least one polarizable material is a refrigerant.

Example 10 includes a gyroscope system including a light source to generate a light signal coupled to at least one phase modulator; the at least one phase modulator formed from a lithium-niobate-based material, wherein at least one surface of the at least one phase modulator is modified by a treatment with at least one treatment gas selected to stabilize defects on the at least one surface; an enclosure enclosing a stabilizing-polarizable-fill gas and at least the at least one phase modulator, the stabilizing-polarizable-fill gas including $N_2O$ and at least one polarizable material, wherein the stabilizing-polarizable-fill gas contacts the at least one modified surface of the phase modulator, and wherein the presence of the at least one polarizable material in the stabilizing-polarizable-fill gas reduces an effect of a charge diffusion on the at least one modified surface of the phase modulator when an electric field is applied to the at least one phase modulator; and a sensing coil configured with coupling components to receive signals from the at least one phase modulator and output signals to the at least one phase modulator.

Example 11 includes the gyroscope system of Example 10, wherein the at least one treatment gas includes a reactive oxidizing gas.

Example 12 includes the gyroscope system of any of Examples 10-11, the at least one polarizable material includes a refrigerant.

Example 13 includes the gyroscope system of any of Examples 10-12, wherein the at least one treatment gas includes at least a first treatment gas and a second treatment gas, wherein the first treatment gas includes a reactive oxidizing gas and the second treatment gas includes N2O, and wherein the at least one polarizable material is a refrigerant.

Example 14 includes the gyroscope system of any of Examples 10-13, wherein the at least one treatment gas includes at least a first treatment gas and a second treatment gas, wherein the first treatment gas is N2O and the second treatment gas is N2, and wherein the at least one polarizable material is a refrigerant.

Example 15 includes the gyroscope system of any of Examples 10-14, wherein the at least one polarizable material is at least one of: a perfluorinated hydrocarbon; a chlorfluorocarbon; a hydrofluorocarbon; a hydrochlorofluorocarbon; a perfluorocarbon; chloromethane; and dichloromethane.

Example 16 includes the gyroscope system of any of Examples 10-15, wherein the at least one treatment gas includes N2O, and wherein the at least one polarizable material is a perfluorinated hydrocarbon.

Example 17 includes a method of stabilizing an integrated optical circuit, the method comprising: providing at least one integrated optical chip formed from at least one inorganic material; treating at least one surface of the integrated optical chip with at least one treatment gas selected to modify the at least one surface to stabilize defects on the at least one surface; positioning the treated integrated optical chip in an enclosure; filling the enclosure with a stabilizing-polarizable-fill gas, the stabilizing-polarizable-fill gas including N2O and at least one polarizable material; and sealing the enclosure to enclose the at least one integrated optical chip and the stabilizing-polarizable-fill gas, wherein the stabilizing-polarizable-fill gas stabilizes the at least one modified surface of the integrated optical chip.

Example 18 includes the method of Example 17, further comprising: applying an electric field to the at least one lithium-niobate-based integrated optical chip.

Example 19 includes the method of Example 18, wherein treating the at least one surface of the integrated optical chip with the at least one treatment gas comprises: treating the at least one surface of the integrated optical chip with a reactive oxidizing gas, wherein the presence of the at least one polarizable material in the stabilizing-polarizable-fill gas reduces an effect of a charge diffusion on the at least one modified surface of the integrated optical chip when an electric field is applied to the at least one lithium-niobate-based integrated optical chip.

Example 20 includes the method of any of Examples 17-19, wherein filling the enclosure with the stabilizing-polarizable-fill gas including N2O and at least one polarizable material comprises: filling the enclosure with N2O and a refrigerant.

What is claimed is:

1. A stabilized integrated optical circuit comprising:
   at least one integrated optical chip formed from at least one inorganic material, wherein at least one surface of the at least one integrated optical chip is modified by a treatment with at least one treatment gas selected to stabilize defects on the at least one surface;
   a stabilizing-polarizable-fill gas including $N_2O$ and at least one polarizable material; and
   an enclosure enclosing the at least one integrated optical chip and the stabilizing-polarizable-fill gas.

2. The stabilized integrated optical circuit of claim 1, wherein the at least one integrated optical chip formed from at least one inorganic material is at least one phase modulator formed from a lithium-niobate-based material.

3. The stabilized integrated optical circuit of claim 2, wherein the at least one treatment gas includes a reactive oxidizing gas.

4. The stabilized integrated optical circuit of claim 3, wherein the at least one polarizable material includes a refrigerant.

5. The stabilized integrated optical circuit of claim 2, wherein the at least one treatment gas includes at least a first treatment gas and a second treatment gas, wherein the first treatment gas includes a reactive oxidizing gas and the second treatment gas includes $N_2O$, and wherein the at least one polarizable material is a refrigerant.

6. The stabilized integrated optical circuit of claim 2, wherein the at least one treatment gas includes at least a first treatment gas and a second treatment gas, wherein the first treatment gas is $N_2O$ and the second treatment gas is $N_2$, and wherein the at least one polarizable material is a refrigerant.

7. The stabilized integrated optical circuit of claim 1, wherein the at least one polarizable material is at least one of: a perfluorinated hydrocarbon; a chlorfluorocarbon; a hydrofluorocarbon; a hydrochlorofluorocarbon; a perfluorocarbon; chloromethane; and dichloromethane.

8. The stabilized integrated optical circuit of claim 1, wherein the at least one integrated optical chip formed from at least one material is formed from a lithium-niobate-based material, wherein the at least one treatment gas includes a reactive oxidizing gas, and wherein the at least one polarizable material is a refrigerant.

9. The stabilized integrated optical circuit of claim 1, wherein the at least one treatment gas includes at least a first treatment gas and a second treatment gas wherein the first treatment gas includes a reactive oxidizing gas and the second treatment gas includes a nonreactive gas, and wherein the at least one polarizable material is a refrigerant.

10. A gyroscope system comprising:
    a light source to generate a light signal coupled to at least one phase modulator;
    the at least one phase modulator formed from a lithium-niobate-based material, wherein at least one surface of the at least one phase modulator is modified by a treatment with at least one treatment gas selected to stabilize defects on the at least one surface;
    an enclosure enclosing a stabilizing-polarizable-fill gas and at least the at least one phase modulator, the stabilizing-polarizable-fill gas including $N_2O$ and at least one polarizable material, wherein the stabilizing-polarizable-fill gas contacts the at least one modified surface of the phase modulator, and wherein the presence of the at least one polarizable material in the stabilizing-polarizable-fill gas reduces an effect of a charge diffusion on the at least one modified surface of the phase modulator when an electric field is applied to the at least one phase modulator; and
    a sensing coil configured with coupling components to receive signals from the at least one phase modulator and output signals to the at least one phase modulator.

11. The gyroscope system of claim 10, wherein the at least one treatment gas includes a reactive oxidizing gas.

12. The gyroscope system of claim 10, the at least one polarizable material includes a refrigerant.

13. The gyroscope system of claim 10, wherein the at least one treatment gas includes at least a first treatment gas and a second treatment gas, wherein the first treatment gas includes a reactive oxidizing gas and the second treatment gas includes $N_2O$, and wherein the at least one polarizable material is a refrigerant.

14. The gyroscope system of claim 10, wherein the at least one treatment gas includes at least a first treatment gas and a second treatment gas, wherein the first treatment gas is $N_2O$ and the second treatment gas is $N_2$, and wherein the at least one polarizable material is a refrigerant.

15. The gyroscope system of claim 10, wherein the at least one polarizable material is at least one of: a perfluorinated hydrocarbon; a chlorfluorocarbon; a hydrofluorocarbon; a hydrochlorofluorocarbon; a perfluorocarbon; chloromethane; and dichloromethane.

16. The gyroscope system of claim 10, wherein the at least one treatment gas includes $N_2O$, and wherein the at least one polarizable material is a perfluorinated hydrocarbon.

17. A method of stabilizing an integrated optical circuit, the method comprising:
    providing at least one integrated optical chip formed from at least one inorganic material;
    treating at least one surface of the integrated optical chip with at least one treatment gas selected to modify the at least one surface to stabilize defects on the at least one surface;
    positioning the treated integrated optical chip in an enclosure;
    filling the enclosure with a stabilizing-polarizable-fill gas, the stabilizing-polarizable-fill gas including $N_2O$ and at least one polarizable material; and
    sealing the enclosure to enclose the at least one integrated optical chip and the stabilizing-polarizable-fill gas, wherein the stabilizing-polarizable-fill gas stabilizes the at least one modified surface of the integrated optical chip.

18. The method of claim 17, further comprising:
    applying an electric field to the at least one lithium-niobate-based integrated optical chip.

19. The method of claim 18, wherein treating the at least one surface of the integrated optical chip with the at least one treatment gas comprises:
    treating the at least one surface of the integrated optical chip with a reactive oxidizing gas, wherein the presence of the at least one polarizable material in the stabilizing-polarizable-fill gas reduces an effect of a charge diffusion on the at least one modified surface of the integrated optical chip when an electric field is applied to the at least one lithium-niobate-based integrated optical chip.

20. The method of claim 17, wherein filling the enclosure with the stabilizing-polarizable-fill gas including $N_2O$ and at least one polarizable material comprises:
 filling the enclosure with $N_2O$ and a refrigerant.

* * * * *